US011820348B2

(12) United States Patent
Ganzel (10) Patent No.: US 11,820,348 B2
(45) Date of Patent: Nov. 21, 2023

(54) USER-MANIPULABLE SIGNAL GENERATING APPARATUS (71) Applicant: ZF Active Safety US Inc., Livonia, MI (US)

(72) Inventor: Blaise J. Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 0 days.

(21) Appl. No.: 17/542,569

(22) Filed: Dec. 6, 2021

(65) Prior Publication Data
US 2023/0182693 A1    Jun. 15, 2023

(51) Int. Cl.
*B60T 7/04* (2006.01)
*G05G 1/38* (2008.04)

(52) U.S. Cl.
CPC ............. *B60T 7/042* (2013.01); *G05G 1/38* (2013.01)

(58) Field of Classification Search
CPC ............ B60T 7/042; B60T 11/18; G05G 1/38
USPC ........................................ 74/512, 513, 514
See application file for complete search history.

(56) References Cited

U.S. PATENT DOCUMENTS

| | | | | |
|---|---|---|---|---|
| 4,695,819 A * | 9/1987 | Bowsher | ................... | G05G 7/04 338/153 |
| 4,800,774 A * | 1/1989 | Hagiwara | ................ | G05G 7/04 74/531 |
| 4,976,166 A * | 12/1990 | Davis | ....................... | F02D 41/28 338/153 |
| 6,571,661 B1 * | 6/2003 | Hemenway | ............... | G05G 5/03 74/526 |
| 6,591,710 B1 * | 7/2003 | Shaw | ........................ | G05G 1/30 74/513 |
| 7,401,865 B2 * | 7/2008 | Shaw | ...................... | B60T 7/042 303/3 |

(Continued)

FOREIGN PATENT DOCUMENTS

DE          10303860 A1      8/2003
DE       112021000550 T5    11/2022

(Continued)

OTHER PUBLICATIONS

Machine translation of WO 2021145287 A1, Yanagida et al., Jul. 22, 2021 (Year: 2021).*

(Continued)

*Primary Examiner* — Vinh Luong
(74) *Attorney, Agent, or Firm* — Robert James Harwood (57) ABSTRACT

A user-manipulable signal generating apparatus includes a base plate and an elongate pedal lever having first and second lever ends separated by a lever body. The first lever end is hingedly connected to the base plate. The second lever end is spaced apart from the base plate for pivotal movement with respect thereto. The lever body is configured to move pivotally between a predetermined home position and a maximum pivot position. An elongate resilient biasing beam has first and second beam ends longitudinally separated by a beam body. The first beam end is connected to the base plate. The second beam end is connected to the lever body. A sensor detects pivotal motion of the lever body and generate a signal responsive thereto. The beam body is biased toward an unflexed condition and, when in the flexed condition, urges the lever body in a return direction toward the home position.

20 Claims, 3 Drawing Sheets

(56) References Cited

U.S. PATENT DOCUMENTS

| | | | |
|---|---|---|---|
| 8,789,441 B2 | 7/2014 | Khan et al. | |
| 2001/0015111 A1* | 8/2001 | Rixon | G05G 1/38 |
| | | | 74/512 |
| 2018/0043866 A1* | 2/2018 | Monsere | B60T 7/06 |
| 2022/0348171 A1* | 11/2022 | Yanagida | G05G 5/03 |

FOREIGN PATENT DOCUMENTS

| | | | | |
|---|---|---|---|---|
| FR | 2875199 A1 * | 3/2006 | | B60T 7/08 |
| WO | WO 2021145287 A1 * | 7/2021 | | B60T 11/18 |

OTHER PUBLICATIONS

Machine translation of FR 2875199 A1, Chatain et al., Mar. 17, 2006 (Year: 2006).*

German Search Report dated Jun. 21, 2023. English translation not provided.

\* cited by examiner

USER-MANIPULABLE SIGNAL GENERATING APPARATUS

TECHNICAL FIELD

This disclosure relates to an apparatus and method for use of a user-manipulable signal generating apparatus and, more particularly, to a user-manipulable signal generating apparatus suitable for use in a brake pedal application to help provide a deceleration signal for a vehicle.

BACKGROUND

In a hydraulic brake system, the driver generates force by pressing on the brake pedal. The force is then amplified by the pedal, booster and master cylinder. The driver will modulate the pressure on the pedal to stop the vehicle, which directly affects hydraulic pressure in the system.

An electrical or "brake-by-wire" system has a similar "feel" to the driver as the hydraulic system, but the electrical system uses one or more position sensors to determine the desired amount and speed of brake application being ordered by the driver.

In electrical and/or hydraulic vehicle brake systems, the driver presses the brake pedal from a "home" position toward an "apply" position indicative of the desired braking action. The brake pedal is spring-biased toward the home position, such that the driver must affirmatively interact with the brake pedal when braking is required. For various reasons related to driver expectations, the pedal return action toward the home position is generally provided through the use of one or more progressive rate steel springs. These springs provide good pedal "feel" for the driver and also assist with pedal travel modulation control. However, the progressive rate steel springs may be complex and expensive to provide to the brake pedal assembly, in terms of fabrication and configuration within a constrained under-dash space.

SUMMARY

In an aspect, alone or in combination with any other aspect, a user-manipulable signal generating apparatus is described. The apparatus includes a base plate and an elongate pedal lever having first and second lever ends separated by a lever body. The first lever end is hingedly connected to the base plate. The second lever end is spaced apart from the base plate in a cantilevered configuration for selective pivotal movement with respect to the base plate. The lever body is configured to move pivotally substantially within a lever plane between a predetermined home position and a maximum pivot position. An elongate resilient biasing beam has first and second beam ends longitudinally separated by a beam body. The first beam end is connected to the base plate. The second beam end is connected to the lever body. The second beam end is configured to move pivotally with respect to the first beam end to cause a flexion condition of the beam body, under influence of motion of the lever body in an apply direction toward the maximum pivot position. A sensor is configured to detect a degree of pivotal motion of the lever body and generate a signal responsive thereto. The beam body is biased toward an unflexed condition and, when in the flexed condition, responsively urges the lever body in a return direction toward the home position.

In an aspect, alone or in combination with any other aspect, a brake pedal assembly is described. A base plate has an anchor plate and a perpendicularly extending support fin. An elongate pedal lever has first and second lever ends separated by a lever body. The first lever end is hingedly attached to the support fin for selective pivotal motion with respect thereto, substantially within a lever plane between a predetermined home position and a maximum pivot position. An elongate resilient biasing beam has first and second beam ends separated by a beam body. The first beam end is attached to the base plate. The second beam end is attached to the lever body. Motion of the pedal lever in an apply direction, from the home position toward the maximum pivot position, causes elastic deformation of the beam body. A sensor is configured to detect a degree of pivotal motion of the lever body and generate a signal responsive thereto.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

FIGS. 1-5 depict a user-manipulable signal generating apparatus 100, including a base plate 102 and an elongate pedal lever 104. The apparatus 100 may comprise at least a portion of a brake pedal assembly, for example, or may be used in any other suitable application in which it is desirable for a user to pivot a lever about a pivot point to generate a signal indicative of a user command.

The elongate pedal lever 104 has first and second lever ends 106 and 108, respectively, separated by a lever body 110. The first lever end 106 is hingedly connected to the base plate 102. The second lever end 108 is spaced apart from the base plate 102 in a cantilevered configuration for selective pivotal movement with respect to the base plate 102. The lever body 110 is configured to move pivotally substantially within a lever plane between a predetermined home position (shown in FIG. 1) and a maximum pivot position (shown in FIG. 4). The lever plane is substantially parallel to the plane of the page, in the orientation of FIGS. 1-4.

Figure 5:
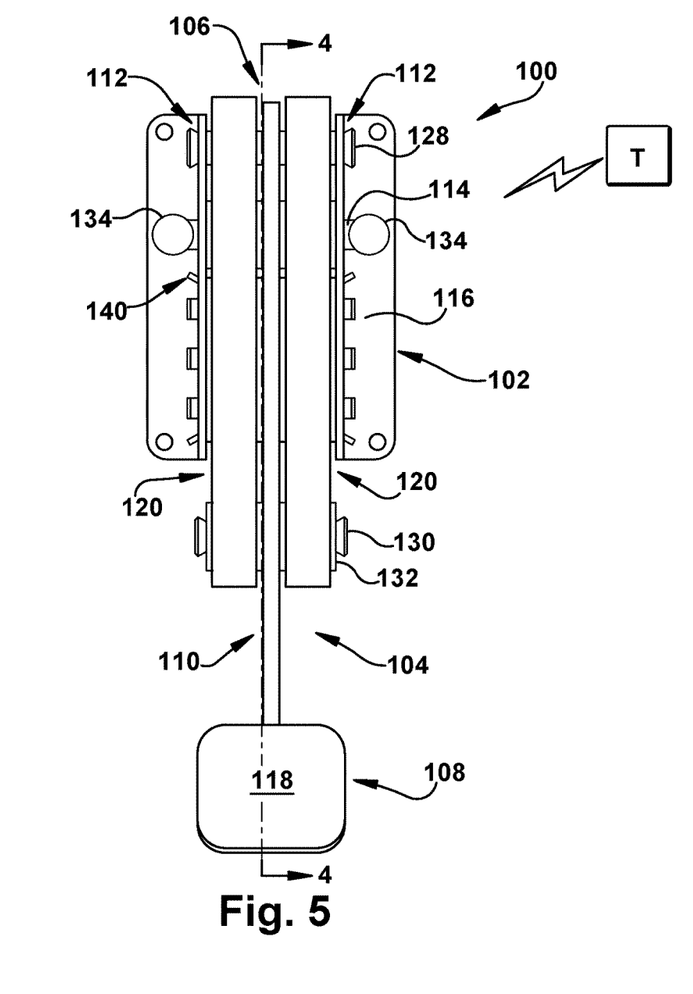
FIG. 5 is a schematic front view of the apparatus of FIG. 1.

As shown in the Figures, the base plate 102 includes at least one support fin 112 extending substantially parallel to the lever plane. (Two support fins 112 are shown in the example version of the apparatus 100, as can be seen in FIG. 5.) The first lever end 106 is hingedly connected to the support fin 112 via a hinge pin 114 penetrating at least partially through both the pedal lever 104 and the support fin 112 in a direction substantially perpendicular to the support fin 112. During rotational travel of the pedal lever 104 between the home position and the maximum pivot position, the pedal lever 104 rotates with respect to the support fin 112. The pedal lever 104 may rotate with respect to the the hinge pin 114 (the hinge pin 114 staying stationary relative to the support fin 112), or, as in many use environments, the hinge pin 114 may at least partially rotate with respect to the support fin 112 (the hinge pin 114 staying at least partially stationary relative to the pedal lever 104).

The base plate 102 may include an anchor plate 116 extending substantially perpendicular to the lever plane. That is, the anchor plate 116 extends into and out of the plane of the page, in the orientation of FIGS. 1-4. The support fin 112 may be connected to the anchor plate 116, when present, and maintained substantially perpendicular thereto. As a result, the anchor plate 116 may be used to mount the apparatus 100 to an underlying surface (not shown), such as, but not limited to, a firewall of a vehicle or another under-dash surface. It is contemplated that the anchor place 116, when present, may be configured with apertures, fasteners, or other features operative to facilitate such mounting.

The second lever end 108 may include a tread surface 118 for receiving user-applied force to pivotally move the second lever end 108 with respect to the base plate 102. The tread surface 118 may be padded or otherwise configured to contact the user's foot to receive force therefrom. For example, and as shown in the Figures, the tread surface 118 may extend substantially perpendicular to the lever plane and be held (e.g., by the angled "neck" configuration of the lever body 110 at the second lever end 108, as shown) at a predetermined angle to facilitate ergonomic interaction with the user's foot.

An elongate resilient biasing beam 120 has first and second beam ends 122 and 124, respectively, longitudinally separated by a beam body 126. The first beam end 122 is connected to the base plate 102, such as via being pinned to the support fin 112 of the base plate 102 by a pedal return stop rod 128, as shown in the Figures. This connection may be substantially fixed or may permit some degree of relative pivotal movement between the biasing beam 120 and the support fin 112. The second beam end 124 is connected to the lever body 110 of the pedal lever 104, such as via being pinned thereto by the lever pin 130 as shown in the Figures. Again, the connection of the second beam end 124 to the lever body 110 may be substantially fixed, or may permit some relative movement therebetween. The second beam end 124 may be affixed to the lever body 110 at a location spaced apart from both the first and second lever ends 106 and 108, to help provide desired biasing properties to the apparatus 100, facilitating efficient assembly of the apparatus 100, avoiding contact with the user's foot, or for any other desired purpose.

At least one of the first and second beam ends 122 and 124 may include a bushing (shown schematically at 132 in FIG. 1) penetrating at least partially therethrough. When present, the bushing 132 may be located at an interface between the biasing beam 120 and a selected (respective) one of the base plate 102 (or a structure thereof, such as the support fin 112) and the pedal lever 104. The bushing may be made from a resilient material (the same one as, or a different one than, at least a portion of the biasing beam 120) or may be made from a substantially rigid material such as, but not limited to, metal, hard plastic, and/or soft plastic. When present, the bushing 132 may assist with protecting the respective first or second beam end 122 or 124 from damage resulting from interaction with the pedal return stop rod 128, the lever pin 130, or forces transmitted therethrough.

The biasing beam 120 may be integrally formed as a single-piece, unitary construct, such as by being molded. It is also contemplated that the biasing beam 120 may include a first beam subassembly (e.g., at least one bushing 132 or a "spine" stiffening structure) overmolded with a second beam subassembly to form the beam body 126, with the first beam subassembly being more rigid than the second beam subassembly. The biasing beam 120 may be made of any desired resilient material or combination thereof, such as, but not limited to, being at least partially made of polyurethane and/or urethane.

The second beam end 124 is configured to move pivotally with respect to the first beam end 122 to cause a flexion condition of the beam body 126. This flexion or bending of the beam body 126, within the lever plane, occurs under influence of the pivotal motion of the lever body 110 with respect to the base plate 102 in an apply direction, toward the maximum pivot position. This flexion condition will be discussed in more detail below.

The beam body 126 is biased toward an unflexed condition by virtue of the material properties of the material(s) that comprise the beam body 126 and the desired hysteresis effects of the material(s). When in the flexed condition, the beam body 126 responsively urges the lever body 110 in a return direction (counter-clockwise about the hinge pin 114, in the orientation of FIGS. 1-4) and toward the home position of FIG. 1. More specifically, biasing of the beam body 126 toward the unflexed condition is operable to resist the user-applied force being exerted upon the tread surface 118 by the user. This biasing is configured to return the lever body 110 toward the home position, in response to being bent or flexed toward the maximum pivot position (clockwise, in the orientation of FIGS. 1-4) by the user-applied force during the brake apply. Accordingly, the biasing beam 126 provides progressive biasing force, due to its resilient material properties, which results in a desired pedal response for many driving conditions.

As shown in FIG. 5, at least one sensor 134, which may be a rotary travel sensor, is provided to the apparatus 100. The sensor 134 is configured to detect a degree of pivotal motion of the lever body 110 and generate a signal responsive thereto. As shown in FIG. 5, two sensors 134 are provided, for redundancy and/or to generate signals for different intended receivers. When there are multiple sensors 134 provided, a first sensor 134 may product a first signal, and the apparatus 100 may includes a second sensor 134 configured to detect a degree of pivotal motion of the lever body 110 and generate a second signal responsive thereto. The first and second signals (and any additional signals generated by any desired number of sensors 134, of the same or different types) may be transferred and used as desired for a particular use environment of the apparatus 100.

When the apparatus 100 is of a brake pedal type, the apparatus 100 may comprise at least a portion of a deceleration signal transmitter for a vehicle. In such case, the signal may be indicative of a desired braking action ordered by the user of the vehicle. The deceleration signal transmitter may also include a transmitter (shown schematically at "T" in FIG. 5) for electronically communicating the signal to an electronic control unit of the vehicle in a wired or wireless manner. The sensor 134 may communicate the signal to the transmitter T in any desired wireless or wired manner, and the transmitter T may perform any desired signal processing task(s) before passing the signal on to the electronic control unit.

As also shown in FIG. 5, the biasing beam 120 is a first biasing beam 120, and the apparatus 100 includes a second biasing beam 120 extending substantially parallel to the first biasing beam 120 with at least a portion of the pedal lever 104 interposed therebetween along a direction substantially perpendicular to the lever plane. The second biasing beam 120, when present, includes first and second biasing beam ends 122 and 124. The first and second biasing beam ends 122 and 124 of the second biasing beam 120 are connected to the base plate 102 and the lever body 110 respectively, similarly to the attachment of the first biasing beam 120. With reference to FIG. 5, the second biasing beam 120 may substantially "mirror" the placement and function of the first biasing beam 120; in this way, additional biasing force can be provided while keeping the dimensions of each of the biasing beams 120 smaller than if a single biasing beam 120 were to be used. The mirrored or symmetrical placement of the first and second biasing beams 120 may also help to equalize lateral forces on the pedal lever 104. Like the first biasing beam 120, the second biasing beam 120, when present, is configured to resist pivotal motion of the pedal lever 104 in the apply direction, toward the maximum pivot position, and to urge the pedal lever 104 in the release direction, toward the home position.

Turning again now to FIGS. 1-4, the base plate 102 may include the aforementioned pedal return stop rod 128, which is configured to restrict pivotal movement of the pedal lever 104 in the return direction beyond the home position shown in FIG. 1. The first lever end 106 may include a stop feature (e.g., notch 136) for selectively interacting with the pedal return stop rod 128 when the pedal lever 104 is in the home position. That is, the notch 136 or other stop feature could be configured to "rest" in contact with the pedal return stop rod 128, optionally with compression therebetween as urged by the biasing beam 120, to provide a repeatable and stable home position for the tread surface 118 to be presented to the user for manipulation. It is contemplated that the pedal return stop rod 128 could instead be used as an attachment point for the first beam end 122 without also providing the pedal lever 104 stop function; one of ordinary skill in the art can provide an apparatus 100 having no such stop function or providing a different stop function structure, with reference to the teachings herein.

The base plate 102 also includes a down stop 138, shown in profile in FIGS. 1-5. The down stop 138 is located proximate the beam body 126 and the lever body 110. At least one of the beam body 126 and the lever body 110 selectively exerts force upon the down stop 138 within or along the lever plane. The down stop 138 resists motion of the beam body 126 and/or the lever body 110 in the apply direction (clockwise or toward the left, in the orientation of FIGS. 1-4), toward the maximum pivot position.

The down stop 138 may include a curved stop surface 140 for cumulatively contacting an elongate portion of the beam body 126 during motion of the beam body 126 in the apply direction, toward the maximum pivot position. The term "cumulatively contacting an elongate portion" is used here to indicate that the contact happens gradually and that a non-elongate portion of the beam body 126 may be initially contacted before such contact accumulates. Due to the curved nature of the stop surface 140 and the resilience of the biasing beam 120, a "rolling" or "rocking" motion is developed therebetween as the pedal lever 104 travels. This sequence is shown schematically in FIGS. 1-4.

Figure 1:
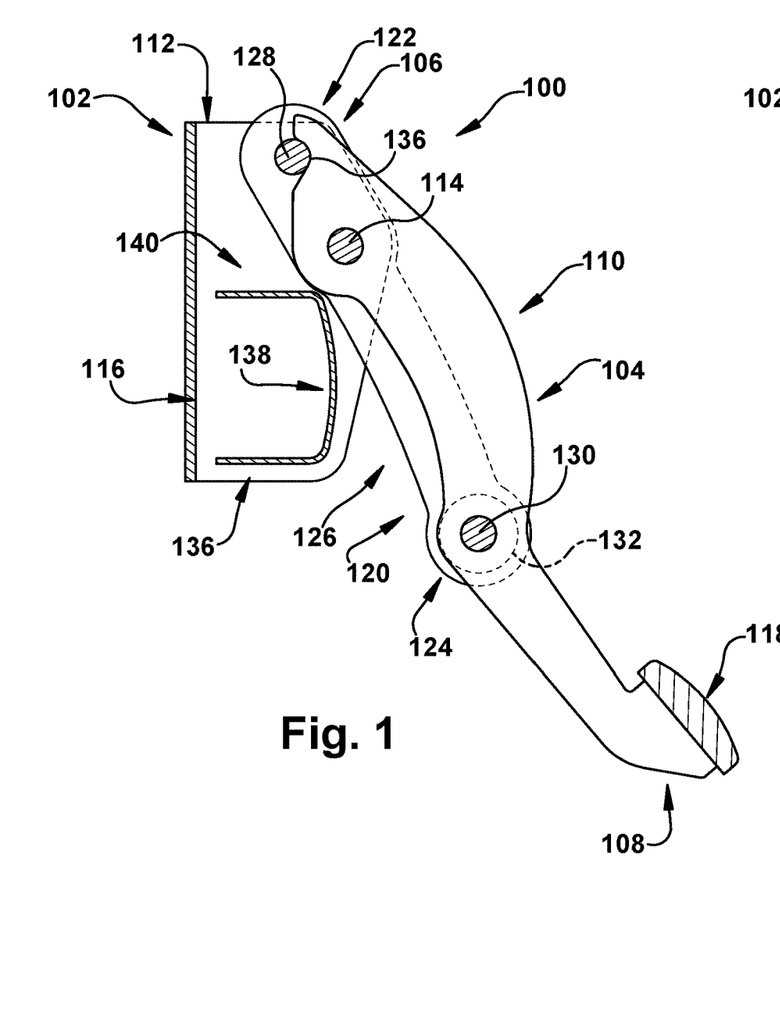
FIG. 1 is a schematic cross sectional view, taken along line 4-4 in FIG. 5, of a user-manipulable signal generating apparatus according to an aspect of the present invention, in a first use position.
Figure 2:
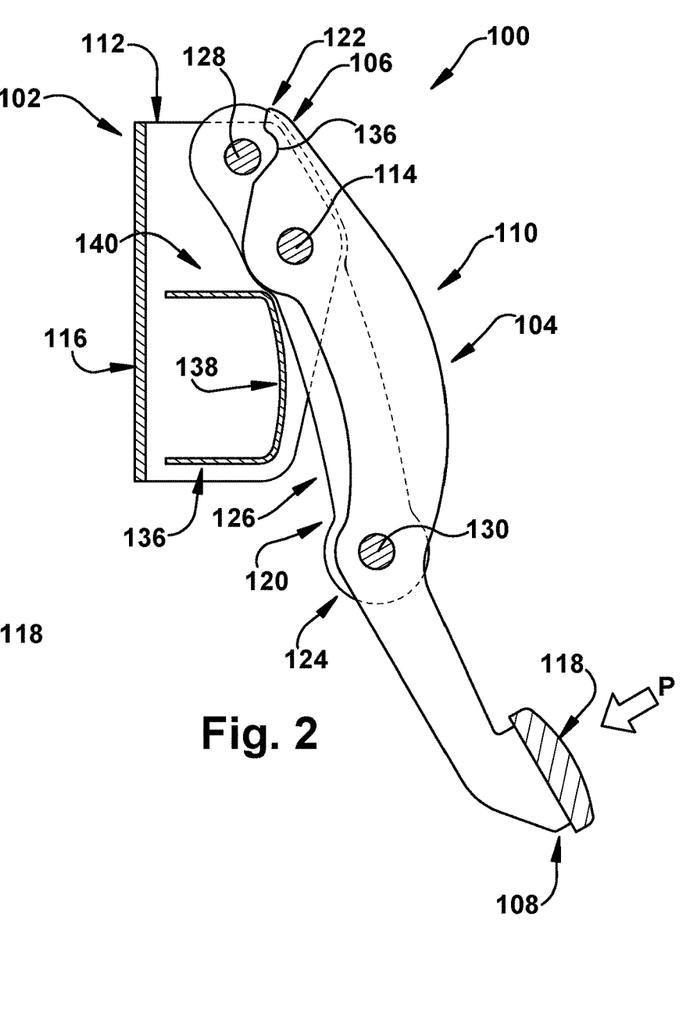
FIG. 2 is a schematic cross sectional view, taken along line 4-4 in FIG. 5, of the apparatus of FIG. 1 in a second use position.

In FIG. 1, the apparatus 100 is shown as being in the rest or home position, where the biasing beam 120 is urging the pedal lever 104 in the counter-clockwise direction about the hinge pin 114, and the notch 136 is resting (or being pushed) against the pedal return stop rod 128. In FIG. 2, the user has pushed in direction "P" against the tread surface 118, causing the second lever end 108 to rotate clockwise out of the home position about the hinge pin 114. The notch 136 has been pivoted away from the pedal return stop rod 128, and the biasing beam 120 is beginning to bend and flex. As can be seen in this momentary "snapshot", the biasing beam 120 is in contact with just a small portion of the stop surface 140.

FIG. 1 shows the apparatus 100 at 0° of travel (home position), and in FIG. 2, the pedal lever 104 has been pivoted a portion of the rotational distance toward the maximum pivot position. For example, if the apparatus 100 is capable of pivoting across a range of about 0° to about 30° (a fairly normal amount of rotation for a brake pedal use environment, then FIG. 2 shows the pedal lever 104 at about 10° of travel. (The degree indicators are example values mentioned for the sake of discussion, with respect to a total 30° arc of travel as shown in FIGS. 1-4; one of ordinary skill in the art can configure an apparatus 100 having a desired travel arc, travel distance, and force responses, given the teachings herein.)

Figure 3:
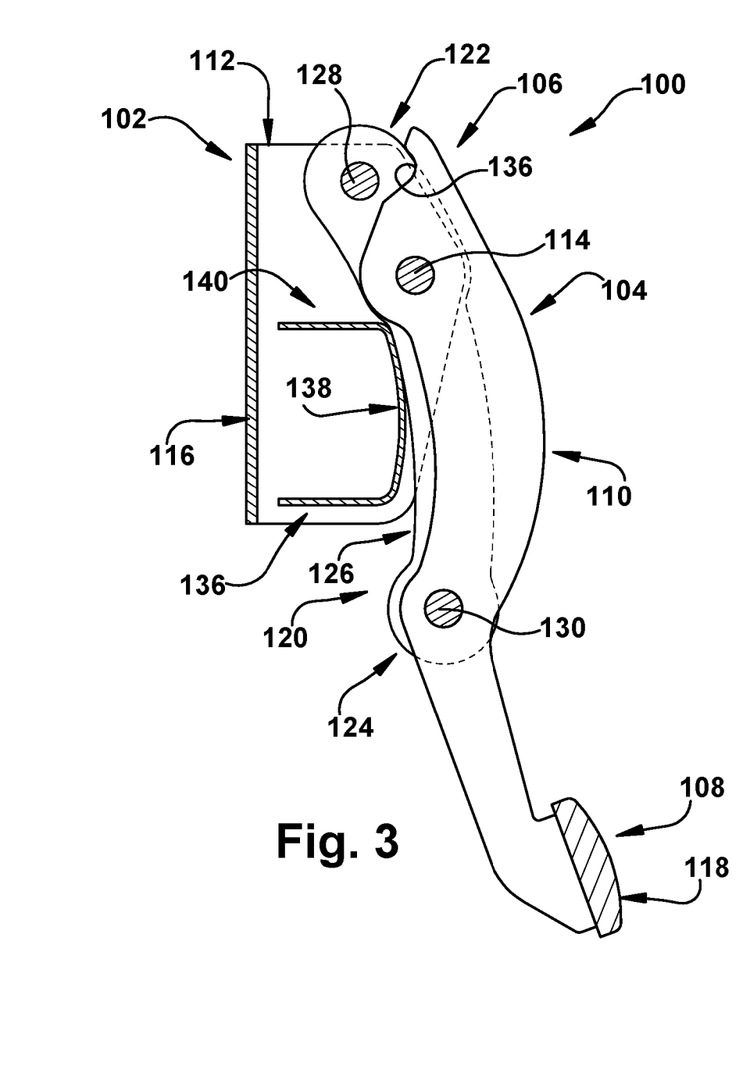
FIG. 3 is a schematic cross sectional view, taken along line 4-4 in FIG. 5, of the apparatus of FIG. 1 in a third use position.

Proceeding in the sequence to FIG. 3, continued force is exerted by the user/driver in direction "P", and the pedal lever 104 continues to pivot clockwise (in the orientation of FIGS. 1-4) to about 20° of travel, as shown in FIG. 3. Here, the beam body 126 is being urged against the stop surface 140 such that the biasing beam 120 flexes under influence of the pedal lever 104 motion.

Figure 4:
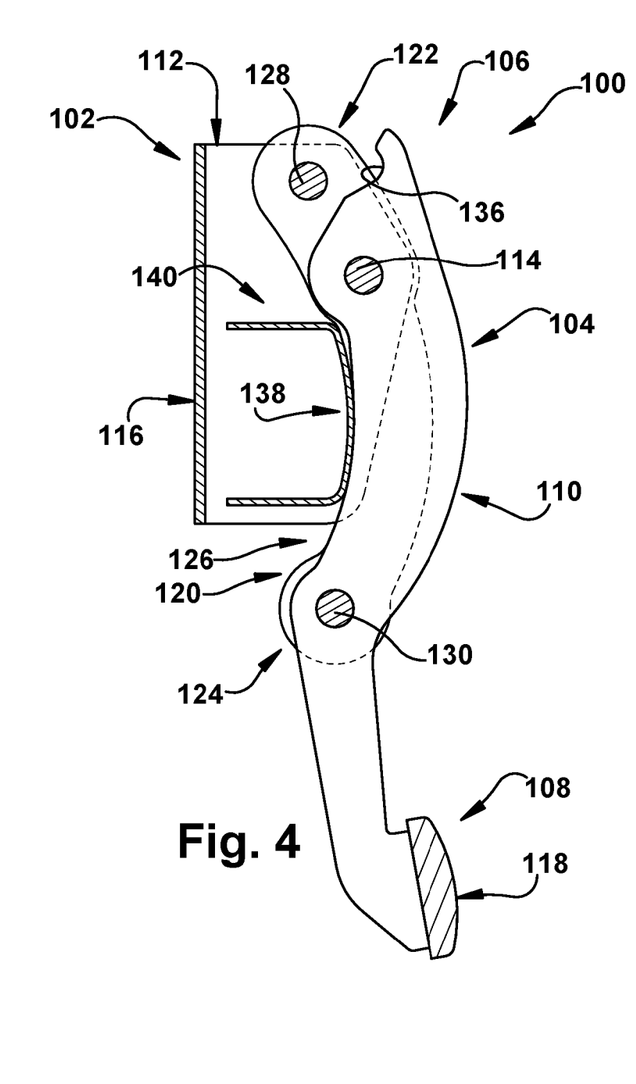
FIG. 4 is a schematic cross sectional view, taken along line 4-4 in FIG. 5, of the apparatus of FIG. 1 in a fourth use position.

Finally, in FIG. 4, the pedal lever 104 has "bottomed out" to a maximum pivot position in which the lever body 110 is at least partially contacted by the down stop 138 to prevent further clockwise travel in the "apply" direction. Once the apparatus 100 has reached the maximum pivot position shown in FIG. 4, the user will be unable to push the tread surface 118 any further in the "P" apply direction, and will normally hold the pedal lever 104 in place, or else release the force in the "P" direction. Upon easing or removal of the "P"-directed force, the resilient force of the biasing beam 120 will urge the pedal lever 104 back in the return direction (counter-clockwise, in the orientation of FIGS. 1-4), and the sequence just described is reversed until the apparatus 100 once more achieves the home position. Interaction between the notch 136 (or other stop feature of the first lever end 106 or another portion of the apparatus 100) and the pedal return stop rod 128 can help ensure that the pedal lever 104 returns to the home position in an accurate and repeatable manner. The pedal lever 104 may travel at any speed(s) or acceleration(s), in either pivotal direction, and without regard to whether either the home or maximum pivot positions have been achieved, as desired by the user and expressed via depression of the tread surface 118 (when present) or other exertion of force in direction "P".

The sensor(s) 134 may be used throughout the travel of the pedal lever 104 to provide a signal, having any desired resolution and configuration, indicative of the instantaneous and/or time-varying travel speed and distance of the pedal lever 104. In this way, when the apparatus 100 is used as a brake pedal of a vehicle, the vehicle may be controlled by a user, who is provided with a familiar and comfortable "feel" for the brake pedal, regardless of the electrical and/or hydraulic nature of the brake system.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

As used herein, phrases such as "between X and Y" and "between about X and Y" can be interpreted to include X and Y.

As used herein, phrases such as "between about X and Y" can mean "between about X and about Y."

As used herein, phrases such as "from about X to Y" can mean "from about X to about Y."

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A user-manipulable signal generating apparatus, comprising:
  a base plate;
  an elongate pedal lever having first and second lever ends separated by a lever body, the first lever end being hingedly connected to the base plate and the second lever end being spaced apart from the base plate in a cantilevered configuration for selective pivotal movement with respect to the base plate, the lever body being configured to move pivotally within a lever plane between a predetermined home position and a maximum pivot position;
  an elongate resilient first biasing beam having first and second beam ends longitudinally separated by a beam body, the first beam end being connected to the base plate and the second beam end being connected to the lever body, the second beam end being configured to move pivotally with respect to the first beam end to cause a flexed condition of the beam body, under influence of motion of the lever body in an apply direction toward the maximum pivot position;

an elongate resilient second biasing beam extending parallel to the first biasing beam with at least a portion of the pedal lever interposed therebetween, the second biasing beam including a first biasing beam end connected to the base plate and a second biasing beam end connected to the lever body, the second biasing beam end being configured to move pivotally with respect to the first biasing beam end to cause a flexed condition of a beam body of the second biasing beam, under influence of motion of the lever body in the apply direction toward the maximum pivot position; and a sensor configured to detect a degree of pivotal motion of the lever body and generate a signal responsive thereto;

wherein the beam bodies of the first and second biasing beams are biased toward an unflexed condition and configured to resist pivotal motion of the pedal lever in the apply direction toward the maximum pivot position, the beam bodies, when in the flexed condition, responsively urging the lever body in a return direction toward the home position.

2. The user-manipulable signal generating apparatus of claim 1, wherein the second lever end includes a tread surface for receiving user-applied force to pivotally move the second lever end with respect to the base plate.

3. The user-manipulable signal generating apparatus of claim 2, wherein biasing of the beam bodies toward the unflexed condition is operable to resist the user-applied force and responsively return the lever body toward the home position.

4. The user-manipulable signal generating apparatus of claim 1, wherein the base plate includes at least one support fin extending parallel to the lever plane, the first lever end being hingedly connected to the support fin via a hinge pin penetrating the pedal lever and the support fin in a direction perpendicular to the support fin.

5. The user-manipulable signal generating apparatus of claim 4, wherein the base plate includes an anchor plate extending perpendicular to the lever plane, the support fin being connected to the anchor plate and maintained perpendicular thereto.

6. The user-manipulable signal generating apparatus of claim 1, wherein the base plate includes a pedal return stop rod configured to restrict pivotal movement of the pedal lever in the return direction beyond the home position.

7. The user-manipulable signal generating apparatus of claim 6, wherein the first lever end includes a notch for selectively interacting with the pedal return stop rod when the pedal lever is in the home position.

8. The user-manipulable signal generating apparatus of claim 1, wherein the second beam end is affixed to the lever body at a location spaced apart from both the first and second lever ends.

9. The user-manipulable signal generating apparatus of claim 1, wherein the base plate includes a down stop located proximate the beam bodies and the lever body, at least one of the beam body of the first biasing beam, the beam body of the second biasing beam and the lever body selectively exerting force upon the down stop along the lever plane, the down stop resisting motion of the at least one of the beam body of the first biasing beam, the beam body of the second biasing beam and the lever body in the apply direction, toward the maximum pivot position.

10. The user-manipulable signal generating apparatus of claim 9, wherein the down stop includes a curved stop surface for cumulatively contacting elongate portions of the beam bodies during motion of the beam bodies in the apply direction, toward the maximum pivot position.

11. The user-manipulable signal generating apparatus of claim 1, wherein the sensor is a first sensor producing a first signal, and the apparatus includes a second sensor configured to detect a degree of pivotal motion of the lever body and generate a second signal responsive thereto.

12. The user-manipulable signal generating apparatus of claim 1, wherein at least one of the first and second biasing beams is integrally formed as a unitary construct.

13. The user-manipulable signal generating apparatus of claim 1, wherein at least one of the first and second biasing beams is at least partially made of polyurethane.

14. The user-manipulable signal generating apparatus of claim 1, wherein at least one of the first and second beam ends includes a bushing penetrating at least partially therethrough, the bushing being located between the first biasing beam and a selected one of the base plate and the pedal lever.

15. A deceleration signal transmitter for a vehicle, comprising:
the user-manipulable signal generating apparatus of claim 1; and
a transmitter for electronically transmitting the signal out from the deceleration signal transmitter;
wherein the signal is indicative of a desired braking action ordered by the user of the vehicle.

16. A brake pedal assembly, comprising:
a base plate having an anchor plate and a perpendicularly extending support fin;
an elongate pedal lever having first and second lever ends separated by a lever body, the first lever end being hingedly attached to the support fin for selective pivotal motion with respect thereto within a lever plane between a predetermined home position and a maximum pivot position;
an elongate resilient first biasing beam having first and second beam ends separated by a beam body, the first beam end being attached to the base plate and the second beam end being attached to the lever body, motion of the pedal lever in an apply direction, from the home position toward the maximum pivot position, causing elastic deformation of the beam body;
an elongate resilient second biasing beam having first and second biasing beam ends separated by a beam body, the first biasing beam end being attached to the base plate and the second biasing beam end being attached to the lever body, motion of the pedal lever in the apply direction, from the home position toward the maximum pivot position, causing elastic deformation of the beam body of the second biasing beam, the second biasing beam extending parallel to the first biasing beam with at least a portion of the pedal lever interposed therebetween; and
a sensor configured to detect a degree of pivotal motion of the lever body and generate a signal responsive thereto.

17. The brake pedal assembly of claim 16, wherein the base plate includes a down stop located proximate the beam bodies and the lever body, at least one of the beam body of the first biasing beam, the beam body of the second biasing beam and the lever body selectively exerting force upon the down stop along the lever plane, the down stop resisting motion of the at least one of the beam body of the first biasing beam, the beam body of the second biasing beam and the lever body in the apply direction, toward the maximum pivot position.

18. A brake pedal assembly, comprising:
- a base plate having an anchor plate and a perpendicularly extending support fin;
- an elongate pedal lever having first and second lever ends separated by a lever body, the first lever end being hingedly attached to the support fin for selective pivotal motion with respect thereto between a predetermined home position and a maximum pivot position;
- an elongate resilient biasing beam having first and second beam ends separated by a beam body, the first beam end being attached to the base plate and the second beam end being attached to the lever body, motion of the pedal lever in an apply direction, from the home position toward the maximum pivot position, causing elastic deformation of the beam body;
- a pedal return stop rod connected to the base plate and configured to directly contact the pedal lever to restrict pivotal movement of the pedal lever in the return direction beyond the home position; and
- a sensor configured to detect a degree of pivotal motion of the lever body and generate a signal responsive thereto.

19. The brake pedal assembly of claim 18, wherein the first lever end includes a notch for receiving the pedal return stop rod when the pedal lever is in the home position, the pedal return stop directly contacting the pedal lever in the notch.

20. The brake pedal assembly of claim 18, wherein the base plate includes a down stop located proximate to the lever body, the down stop being configured to directly contact the pedal lever to restrict pivotal movement of the pedal lever in the apply direction beyond the maximum pivot position.

\* \* \* \* \*